United States Patent
Foster

(10) Patent No.: US 10,780,818 B2
(45) Date of Patent: Sep. 22, 2020

(54) TRI-STATE TRAILER PIGTAIL

(71) Applicant: Bendix Commercial Vehicle Systems LLC, Elyria, OH (US)

(72) Inventor: Rick Foster, Elyria, OH (US)

(73) Assignee: BENDIX COMMERICAL VEHICLE SYSTEMS LLC, Elyria, OH (US)

(*) Notice: Subject to any disclaimer, the term of this patent is extended or adjusted under 35 U.S.C. 154(b) by 0 days.

(21) Appl. No.: 16/217,514

(22) Filed: Dec. 12, 2018

(65) Prior Publication Data

US 2020/0189445 A1    Jun. 18, 2020

(51) Int. Cl.
| | |
|---|---|
| *B60D 1/62* | (2006.01) |
| *H05B 47/10* | (2020.01) |
| *B60Q 1/00* | (2006.01) |
| *B60Q 1/30* | (2006.01) |
| *B60Q 1/34* | (2006.01) |
| *B60Q 1/44* | (2006.01) |
| *H01R 13/70* | (2006.01) |
| *B60Q 1/50* | (2006.01) |
| *H01R 107/00* | (2006.01) |
| *H04L 12/40* | (2006.01) |

(52) U.S. Cl.
CPC ............. *B60Q 1/0094* (2013.01); *B60Q 1/30* (2013.01); *B60Q 1/34* (2013.01); *B60Q 1/44* (2013.01); *B60Q 1/50* (2013.01); *H01R 13/70* (2013.01); *B60D 1/62* (2013.01); *H01R 2107/00* (2013.01); *H01R 2201/26* (2013.01); *H04L 12/40013* (2013.01)

(58) Field of Classification Search
CPC ... B60Q 1/30; B60Q 1/34; B60Q 1/44; B60Q 1/50; B60Q 1/0094; H01R 13/70; H01R 2107/00; H01R 2201/26; H04L 12/40013; B60D 1/62
See application file for complete search history.

(56) References Cited

U.S. PATENT DOCUMENTS

| | | | |
|---|---|---|---|
| 5,080,594 A | | 1/1992 | Swinford |
| 5,127,939 A | | 7/1992 | Panigrahy et al. |
| 5,488,352 A | | 1/1996 | Jasper |
| 5,521,466 A | * | 5/1996 | Vincent ................. B60Q 1/305 315/77 |
| 5,693,985 A | | 12/1997 | Gee et al. |

(Continued)

FOREIGN PATENT DOCUMENTS

| | | |
|---|---|---|
| AU | 2017228514 A1 | 3/2018 |
| DE | 10 2010 051 584 A1 | 5/2012 |

(Continued)

*Primary Examiner* — Henry Luong
(74) *Attorney, Agent, or Firm* — Fay Sharpe LLP

(57) ABSTRACT

A tri-state electronic vehicle system control circuit comprises a plurality of 3-position switches, each of which is coupled to a dedicated pin on a wiring harness for coupling multiple portions of a combination vehicle such as a tractor-trailer combination. Each switch controls a device (e.g., brake lights, turn signal, etc.) and a data link that can be selectively toggled in a manner that permits data transmission without perceptibly affecting device function. Alternatively, two devices controlled by a given switch can be enabled by a single pin on the wiring harness. The tri-state switching circuitry thus doubles the capacity of the wiring harness to which it is applied.

25 Claims, 9 Drawing Sheets

(56) References Cited

U.S. PATENT DOCUMENTS

| | | |
|---|---|---|
| 5,739,592 A | 4/1998 | Rigsby et al. |
| 5,775,712 A | 7/1998 | Link et al. |
| 5,905,433 A | 5/1999 | Wortham |
| 7,286,046 B2 | 10/2007 | Kinsey et al. |
| 7,932,623 B2 | 4/2011 | Burlak et al. |
| 8,932,065 B2 | 1/2015 | Gerling |
| 9,069,026 B1 | 6/2015 | Rutkowsky |
| 9,444,207 B1 * | 9/2016 | Smith ................. H01R 31/065 |
| 2008/0315556 A1 | 12/2008 | Mikulas |

FOREIGN PATENT DOCUMENTS

| | | |
|---|---|---|
| DE | 10 2012 020 033 A1 | 4/2014 |
| EP | 0 718 925 A1 | 6/1996 |
| EP | 0 546 370 B1 | 5/1997 |
| EP | 1 029 745 A2 | 8/2000 |
| EP | 1 305 174 A1 | 5/2003 |
| EP | 1 681 207 B1 | 7/2006 |
| EP | 1 052 142 B1 | 8/2007 |
| EP | 2 658 181 B1 | 10/2013 |
| EP | 3 243 244 A1 | 11/2017 |
| EP | 3 331 103 A1 | 6/2018 |
| EP | 2 884 599 B1 | 8/2018 |
| GB | 2 023 946 B | 1/1980 |
| WO | 00/24611 A | 5/2000 |
| WO | 2017/064280 A1 | 4/2017 |

\* cited by examiner

TRI-STATE TRAILER PIGTAIL

BACKGROUND

The present application finds particular application in vehicle electronic control devices. However, it will be appreciated that the described techniques may also find application in other electronic control systems, or other electronic coupling devices.

Conventional electronic systems designed to provide wired communications between a tractor-and-trailer type vehicle typically require the tractor and trailer manufacturers to add an additional multi-pin connector to the tractor, another multi-pin connector to the trailer, and an additional multi-conductor wiring harness to tie them together. This approach is costly and cumbersome.

FIG. 1 illustrates a conventional tractor-trailer lighting pigtail harness arrangement 10, wherein all lights are hardwired to ground and activated with the application of +12V. For instance, a tractor portion 12 of a circuit is coupled via a lighting harness 14 to a trailer portion 16 of the circuit. The trailer portion 16 comprises one or more marker lights 18 (in the instant example), which are illuminated when a switch 20 in the tractor portion 12 of the circuit is in a closed position. The example illustrated in FIG. 1 represents a single ON/OFF (dual state) circuit as is conventional.

The above-described dual-state pigtail has an insufficient number of pins for providing reliable communications between tractor and trailer electronic controller units (ECUs) without interrupting or interfering with trailer light operation. Currently, each pin is dedicated to only one ON/OFF function: e.g., 1 pin for brake lights, 1 pin for tail lights, etc. Thus, using a conventional system, an additional wiring harness between tractor and trailer is required for direct wired control of any additional electronic trailer products.

The present innovation provides new and improved systems and methods that facilitate providing improved device switching and control capacity for electrical vehicle connectors, which overcome the above-referenced problems and others.

SUMMARY

In accordance with one aspect, tri-state switching device that facilitates selectively providing power and data transmission via a connection in a vehicle comprises a microprocessor configured to communicate over a plurality of data communication lines and coupled to a plurality of tri-state switches, and circuitry comprising the plurality of tri-state switches each configured to switch between a first position, a second position, and an open position. The microprocessor is further configured to control selectively the position of each switch. In the first position each switch provides power to a first on-board device, and wherein in the second position each switch provides power to a second on-board device or provides a data communication connection over which data can be transmitted and received. At least one of the switches is configured to control switching between providing power to the first and second on-board devices and providing the data communication connection.

In accordance with another aspect, tractor-side tri-state switching device that facilitates selectively providing power and data transmission via a connection from a tractor in a combination vehicle comprises a printed circuit board (PCB) comprising a microprocessor configured to control selectively a position of each of five tri-state switches, each switch being coupled to one of five respective dedicated pins on the connector, wherein each switch configured to switch between a first position, a second position, and an open position. In the first position each switch provides power to a first vehicle lamp system, and wherein in the second position each switch provides power to a second vehicle lamp system or provides a data communication connection over which data can be transmitted and received. At least one of the switches is configured to control switching between providing power to a first or second vehicle lamp system and providing the data communication connection.

In accordance with another aspect, down-stream tri-state switching device that facilitates selectively providing power and data transmission via a connection received from a tractor upstream in a combination vehicle comprises a printed circuit board (PCB) comprising a microprocessor configured to control selectively a position of each of five tri-state switches, each switch being coupled to one of a plurality of respective dedicated pins on an input connector and to corresponding pins on an output connector, wherein each switch is configured to switch between a first position, a second position, and an open position. In the first position, each switch provides power to a first vehicle lamp system, and in the second position each switch provides power to a second vehicle lamp system or provides a data communication connection over which data can be transmitted and received. At least one of the switches is configured to control switching between providing power to the first or second vehicle lamp system and providing the data communication connection.

One advantage is that working pin capacity on the 7-pin electrical connector is doubled.

Another advantage is that data transmission capability is increased.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods.

According to one embodiment, the described Tri-State Pigtail/Trailer Lighting Harness Control uses solid-state switching circuits that take advantage of existing pins on the wiring harness connection to double the device-switching/control capacity of the pigtail connection, thus eliminating the need for additional wiring harnesses. Unlike the conventional configuration that simply applies 12V to each pin to make it active, the herein-described design can apply 12V or ground to the pin to make it active, which effectively doubles the working capacity of each pin. For example, controller area network (CAN) buses, SAE J1939-standard buses, etc., can be used on any of the lighting pins of the connector and will do so with increased noise immunity and reliability compared to conventional Power Line Carrier (PLC) systems.

Figure 1:
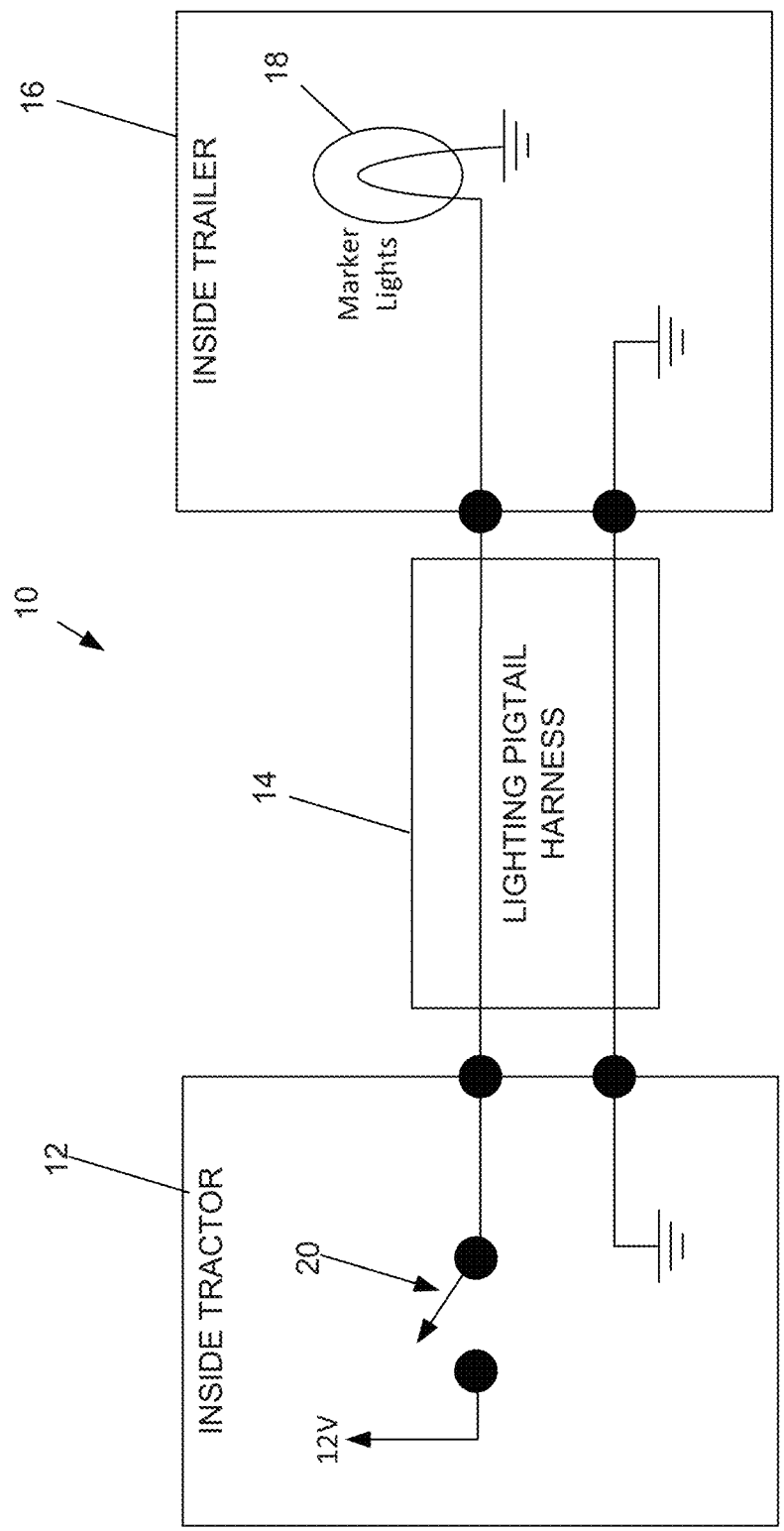
FIG. 1 illustrates a conventional tractor-trailer lighting pigtail harness arrangement, wherein all lights are hardwired to ground and activated with the application of +12V.
Figure 2:
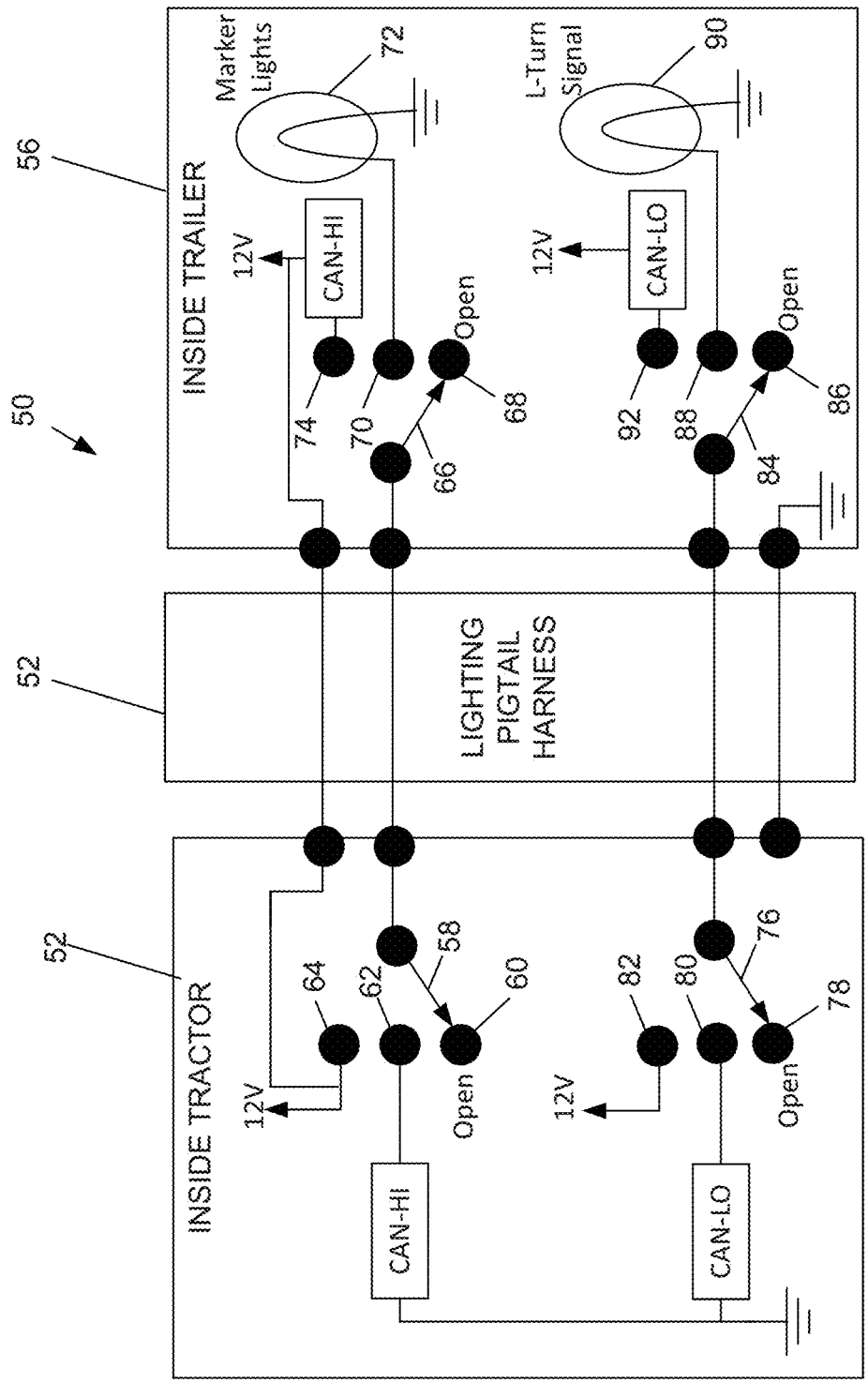
FIG. 2 illustrates a tri-state circuit arrangement for coupling a tristate tractor circuit 52 via a conventional pigtail harness to a tristate trailer circuit.

FIG. 2 illustrates a tri-state circuit arrangement 50 for coupling a tristate tractor circuit 52 via a conventional pigtail harness 54 to a tristate trailer circuit 56. The tristate circuit 50 can be used in a high-current tri-state mode that allows for alternating between providing power and permitting CAN communications on the same line (pigtail pin) as high-current devices such as marker, brake, or turn-signal lamps. This creates the ability to reliably transmit/receive CAN using the existing harness, without a need for additional wiring harnesses. That is, the claimed innovation facilitate s providing alternately power supply and communication capability on the same line, such that, e.g., CAN messages can be transmitted over a line that is already powering a lamp on the trailer using a high-speed solid-state switch to interrupt power to the lamp and direct the communication signal to the trailer's CAN bus. When the CAN data transmission is complete, the tri-state circuit switches out of the communications-mode and returns power to the lamp. The switching sequence is executed in, e.g., 10 mS or less so that the interruption to the lamp power supply is imperceptible to the human eye. While this sequence executes, the powered lamp appears to the observer to be continuously on without interruption.

The tri-state tractor circuit 52 comprises a first switch 58 that switches between three nodes: and "open" node 60, a CAN-HI node 62 for data communication, and a 12V node 64 for providing power to a device on the trailer. The tristate trailer circuit 56 comprises a second switch 66 that also switches between three nodes: an "open" node 68, a device node 70 that is coupled to a device 72 (marker lights on the trailer in the illustrated example), and a CAN-HI node 74. When the switch 58 is coupled to the 12V node 64 and the switch 66 is coupled to the device 72, the marker lights are illuminated via 12V signal. When data communication is desired, the switch 58 is moved to the CAN-HI node 62 and the switch 66 is moved to the CAN-HI node 74. Data communication can be performed for a predetermined time-period lasting, e.g., tens of milliseconds or the like, and upon expiration of the data transmission period the switch 58 is returned to the 12V node and the switch 66 is returned to the device node 70. In this manner, the brief interruption of power to the device 72 is imperceptible to a human viewer. That is, the marker lights appear to remain on continuously.

The tristate tractor circuit 52 also comprises a third switch 76 that is switchable between three nodes: and "open" node 78, a CAN-LO node 80 for data communication, and a 12V node 82 for providing power to a second device on the trailer. The tristate trailer circuit 56 comprises a fourth switch 84 that also switches between three nodes: an "open" node 86, a device node 88 that is coupled to a second device 90 (a left-hand turn signal on the trailer in the illustrated example), and a CAN-LO node 92. The third and fourth switches 76, 84 operate in similar fashion to the first and second switches 58, 66 to alternate between supplying power to the second device 90 and providing data communication over the CAN-LO line. CAN-HI and CAN-LO are synchronized.

The switches depicted represent block-diagram operation only. In one embodiment, the switches are logic-controlled solid-state switches. In the milliseconds-long time-period during which data is transmitted, the trailer light(s) that are connected to the data line are temporarily turned off. When the data transmission is complete, the light(s) is turned back on. The data-transmission period is so short (e.g., 25 mS or so) that the light appears to be continuously on.

The described design facilitates developing future electronically-controlled products, and providing power therefore using existing N-pin connectors, where N is an integer, used for trailers in all combinations: e.g., single, doubles, triples, etc. Because the herein-described design uses improves the capacity of industry-standard trailer pigtail configurations, it can be easily integrated into all commercial truck-tractors, converter dollies, and trailers built by all manufacturers. The described system also facilitates reliable data transmission data over conventional wired connections, so that, e.g., a tire pressure monitoring system (TPMS) trailer link need not be wireless, thus improving data integrity by mitigating RF interference. Extant trailer lighting pigtail connections for CAN communications, auxiliary light control, solenoid control, etc. can be used with no detriment to the trailer lighting, which facilitates providing control for any future design or system for electronic products to be used on any manufacturer of truck, trailer, or combination.

According to one embodiment, the described Tri-State Pigtail/Trailer Lighting Harness Control system uses a solid-state logic-controlled high-current totem pole switch on each pin of the pigtail. The totem pole switches are located in the pigtail on the tractor-side and are controlled by the tractor electronic control unit (ECU), turn-signal switch, brake light switch, etc. In this manner, ground, 12V, or an open can be applied to each pin, giving it a tri-state operation. There is safety logic in the circuit that prevents ground and 12V from being simultaneously applied at the output, even if both inputs are accidentally active at the same time. Because the totem pole switching is solid-state, it is fast enough to be used for CAN communications, even when communications are required on the same pin that has an active trailer light on it. For example: if the CAN is being transmitted on the right-hand turn-signal pin while the right-hand turn light is on, the light can be turned off for, e.g., 25 mS while the data is transmitted and then turned back on after the data transmission has ended. Most turn-signals for commercial vehicles have a flash period of 500 mS with a 50% duty-cycle. The off-time is 250 mS, which provides more than enough time to transmit data on the same pin used by one of the turn-signals.

Conventional Power Line Communication (PLC) systems modulate data on the power line and do so without being able to get the signal above the noise floor. Any noise on the power line will make reading of data difficult, making the conventional communication system highly unreliable. As described herein, using CAN communications on one of the shared pins provides improved robustness and reliability relative to existing PLC systems. When data is transmitted on one of these pins using the described approach, it has clean, distinct transitions from 12V to ground. This feature greatly increases the robustness of transmitted data and guarantees that the data will be received exactly as it was transmitted.

The trailer-side of the pigtail harness uses solid-state switches that both detect and switch ground, 12V, or open on each pin. This sends the ground/12V to the correct device (active by ground or active by 12V), i.e., one of the two devices assigned to that pin. The solid-state switches prevent two loads tied to one pin from accidentally forming a voltage divider and simultaneously operating both loads at ½ power when the state of the pin is supposed to be open. A printed circuit board (PCB) containing the switching circuits for both the tractor-side and trailer-side is fabricated to fit inside of the box that receives the pigtails for ease of installation on each side. Alternatively, the circuitry can be combined with existing braking controllers on the vehicle, such as an EC-80 controller on the tractor and a TABS6 controller on the trailer, as sold by Bendix Commercial Vehicle Systems LLC.

The described system facilitates providing reliable CAN communication with complex devices with high-volume data transmission such as yaw-rate sensors and accelerometers. The conventional PLC system does not support high-volume data transmission. Because the conventional PLC system has no ability to reliably communicate with the tractor, conventional trailer antilock brake systems (ABS) need to be able to operate autonomously which increases manufacturing costs, as this adds complexity to the electronic controls. Under the herein-described approach, using the existing lighting harness for CAN communications between tractor and trailer, the trailer ABS unit need only be a smart driver/receiver of its internal solenoids, external modulator(s), and wheel-speed sensors; thus, reducing the cost of the trailer ABS unit.

The described system also facilitates multi-line communication on the existing lighting harness, which in turn facilitates the implementation of a wide range of trailer products. In one embodiment, the tri-state circuit(s) described herein use MOSFETs for communication drivers and high-current switching of lights and other devices and can also employ standard transistor-transistor logic (TTL) gates and tri-state buffers that will easily interface with all current ECUs. The described tri-state circuit also has extremely high noise-immunity and can be used on large vehicle combinations such as double and triple trailer combinations. Conventional PLC systems cannot communicate beyond the first trailer in these combinations.

Figure 3:
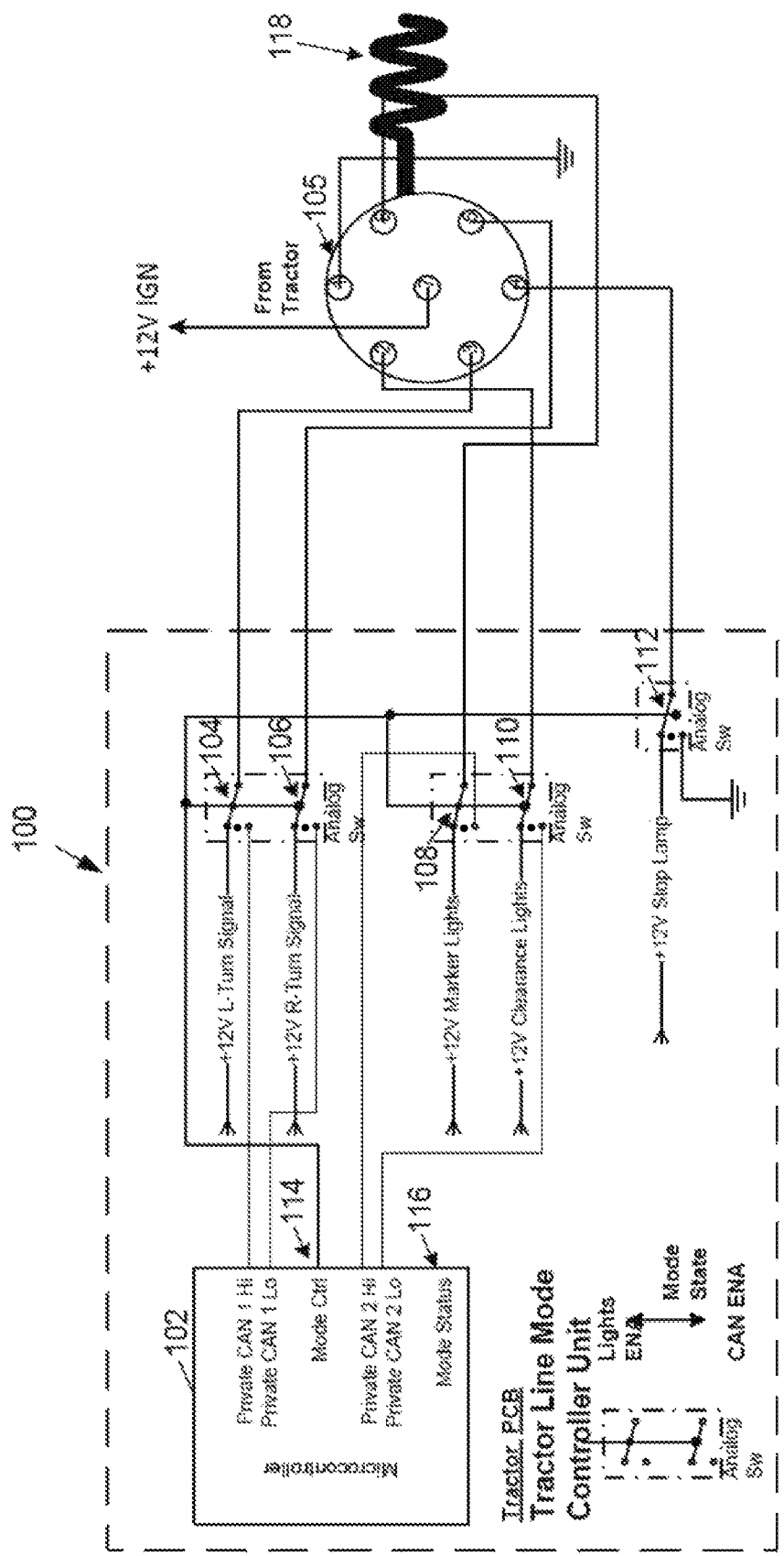
FIG. 3 illustrates a tri-state tractor-side circuit such as may be employed on a printed circuit board (PCB) in a tractor vehicle that couples to one or more trailers, in accordance with one or more features described herein.

FIG. 3 illustrates a tri-state tractor-side circuit 100 such as may be employed on a printed circuit board (PCB) in a tractor vehicle that couples to one or more trailers, in accordance with one or more features described herein. The circuit comprises a microcontroller (a processor, microprocessor, etc.) 102 having a plurality of bidirectional ports, including a CAN 1 HI port that is coupled to a first switch 104 that switches between the CAN 1 HI line and a 12V left-hand turn signal line. The first switch 104 is also coupled to pin 3 on a 7-pin connector 105 that provides a connection between the tractor portion of the vehicle and a first trailer. A CAN 1 LO port is coupled to a second switch 106 that switches between the CAN 1 LO line and a 12V right-hand turn signal line. The second switch 106 is also coupled to pin 5 on the 7-pin connector 105.

A CAN 2 HI port is coupled to a third switch 108 that switches between the CAN 2 HI line and a 12V marker lights line. The third switch 108 is also coupled to pin 6 on the 7-pin connector 105. A CAN 2 LO port is coupled to a fourth switch 110 that switches between the CAN 2 LO line and a 12V clearance lights line. The fourth switch 110 is also coupled to pin 2 on the 7-pin connector 105. A fifth switch 112 switches between a 12V stop lamp line and ground and is also coupled to pin 4 of the 7-pin connector. Pin 1 of the 7-pin connector is connected to ground, and pin 7 is connected to a 12V ignition line. A pigtail connection 118 is shown, which connects each pin of the 7-pin connector 105 to a corresponding pin on a corresponding 7-pin connector 155 (see FIG. 4) on the first trailer of the vehicle.

The microcontroller 102 further comprises a mode controller output 114 coupled to each of the plurality of switches 104, 106, 108, 110, 112 and via which the microcontroller controls the state plurality of switches to enable either the lights to which the switch is coupled or CAN communication, etc., and which is coupled to each switch. The switches receive the control from via a mode control line coupled to the mode control output 114, which is initially changed by the microcontroller of the tractor. The tractor microcontroller may use PLC to initiate the switch or may use a signal on, e.g., the stop lamp. Additionally, a mode status pin 116 is configured to indicate a status of each switch to the microcontroller.

Figure 4:
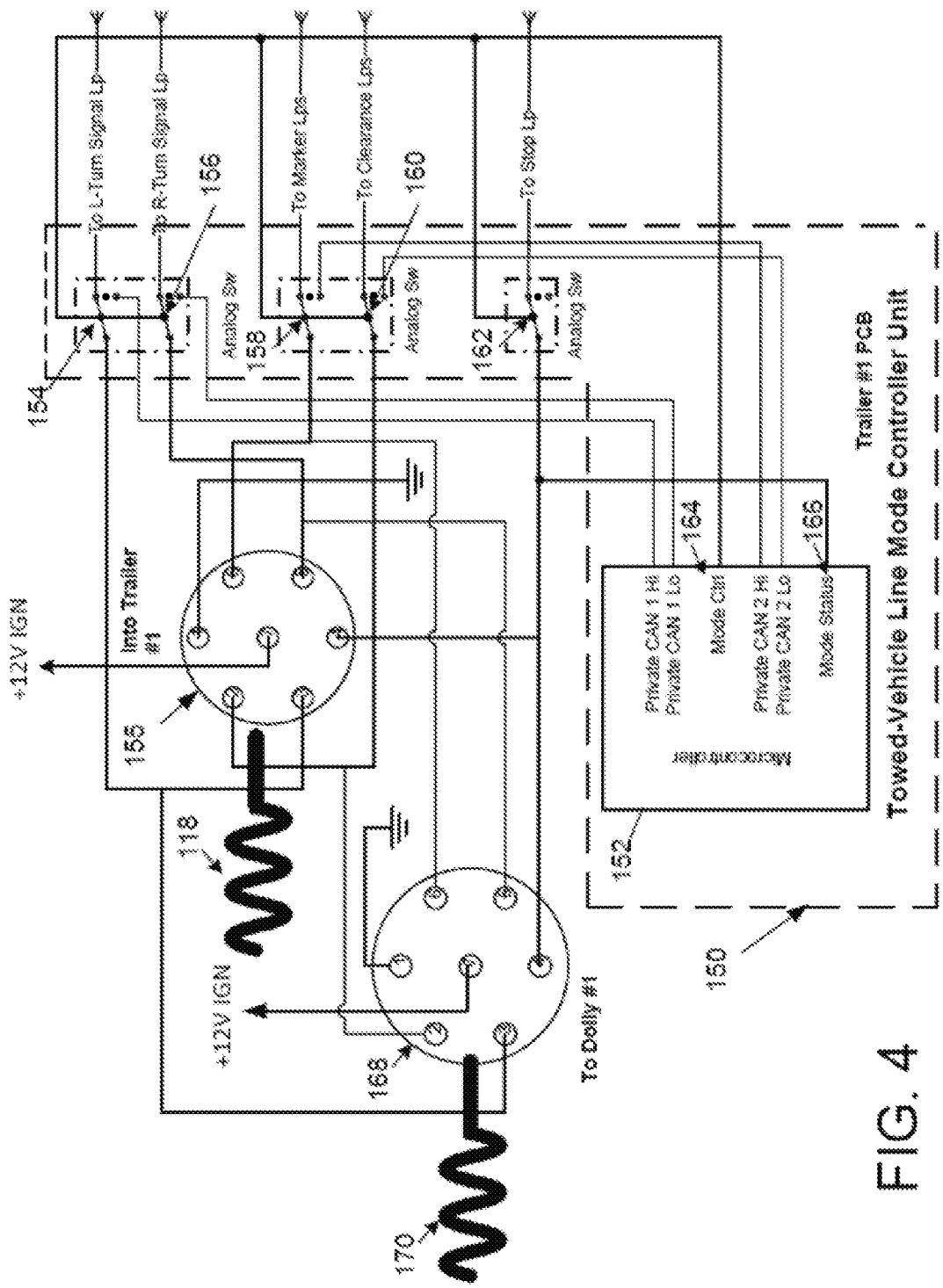
FIG. 4 illustrates a tri-state trailer-side circuit such as may be employed on a printed circuit board (PCB) in a trailer vehicle that couples to a tractor, in accordance with one or more features described herein.

FIG. 4 illustrates a tri-state trailer-side circuit 150 such as may be employed on a printed circuit board (PCB) in a trailer vehicle that couples to a tractor, in accordance with one or more features described herein. The circuit comprises a microcontroller or processor 152 having a plurality of bidirectional ports, including a CAN 1 HI port that is coupled to a first switch 154 that switches between the CAN 1 HI line and a 12V left-hand turn signal line. The first switch 154 is also coupled to pin 3 on a 7-pin connector 155 that provides a connection between the tractor portion of the vehicle and the trailer. A CAN 1 LO port is coupled to a second switch 156 that switches between the CAN 1 LO line and a 12V right-hand turn signal line. The second switch 156 is also coupled to pin 5 on the 7-pin connector 155.

A CAN 2 HI port is coupled to a third switch 158 that switches between the CAN 2 HI line and a 12V marker lights line. The third switch 158 is also coupled to pin 6 on the 7-pin connector 155. A CAN 2 LO port is coupled to a fourth switch 160 that switches between the CAN 2 LO line and a 12V clearance lights line. The fourth switch 160 is also coupled to pin 2 on the 7-pin connector 155. A fifth switch 162 switches between a 12V stop lamp line and ground and is also coupled to pin 4 of the 7-pin connector. Pin 1 of the 7-pin connector is connected to ground, and pin 7 is connected to a 12V ignition line.

The microcontroller 152 further comprises a mode controller output 164 coupled to each of the plurality of switches 154, 156, 158, 160, 162 and via which the microcontroller controls the state plurality of switches to enable either the lights to which the switch is coupled or CAN communication. Additionally, a mode status pin 166 is configured to indicate a status of each switch to the microcontroller.

A pigtail connection 118 is shown, which connects each pin of the 7-pin connector 155 to a corresponding pin on a corresponding 7-pin connector 105 (see FIG. 3) on the tractor of the vehicle. A signal line is provided for each pin of an output 7-pin connector 168 via an output pigtail connection 170, which couples each pin to its corresponding pin (i.e., pin1-pin1, pin2-pin2, etc.) on an input 7-pin connector 205 (FIG. 5) on a dolly that couples the first trailer to a second trailer when a multi-trailer configuration is desired.

Figure 5:
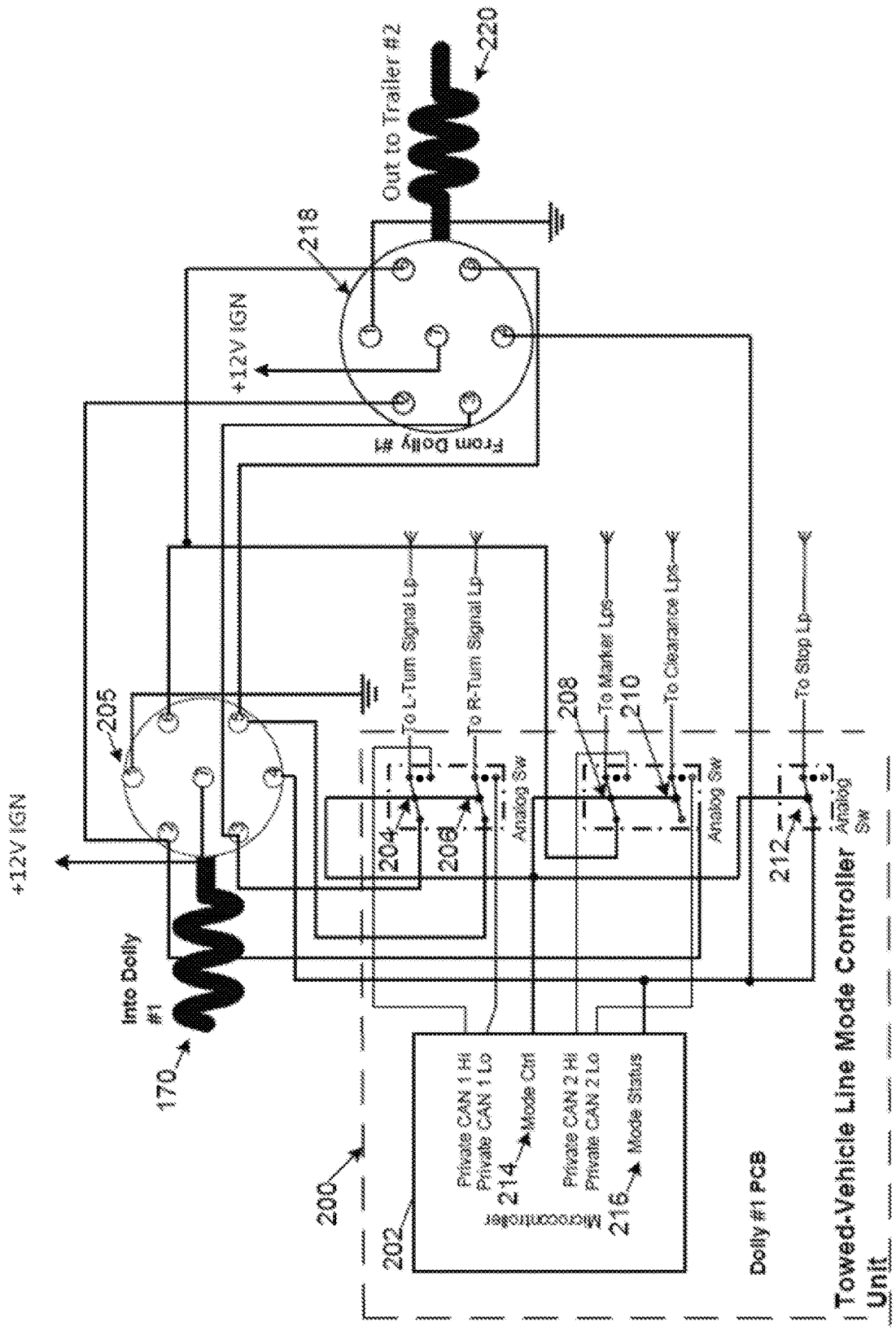
FIG. 5 illustrates a tri-state dolly circuit such as may be employed on a printed circuit board (PCB) in a dolly that couples two trailer portions of a vehicle together (e.g., in a double or triple trailer configuration), in accordance with one or more features described herein.

FIG. 5 illustrates a tri-state dolly circuit 200 such as may be employed in a dolly that couples two trailer portions of a vehicle together (e.g., in a double or triple trailer configuration), in accordance with one or more features described herein. The circuit comprises a microcontroller or processor 202 having a plurality of bidirectional ports, including a CAN 1 HI port that is coupled to a first switch 204 that switches between the CAN 1 HI line and a 12V left-hand turn signal line. The first switch 204 is also coupled to pin 3 on an input 7-pin connector 205 that provides a connection between the dolly portion of the vehicle and the first trailer (FIG. 4). A CAN 1 LO port is coupled to a second switch 206 that switches between the CAN 1 LO line and a 12V right-hand turn signal line. The second switch 206 is also coupled to pin 5 on the 7-pin connector 205.

A CAN 2 HI port is coupled to a third switch 208 that switches between the CAN 2 HI line and a 12V marker lights line. The third switch 208 is also coupled to pin 6 on the 7-pin connector 205. A CAN 2 LO port is coupled to a fourth switch 210 that switches between the CAN 2 LO line and a 12V clearance lights line. The fourth switch 210 is also coupled to pin 2 on the 7-pin connector 205. A fifth switch 212 switches between a 12V stop lamp line and ground and is also coupled to pin 4 of the 7-pin connector. Pin 1 of the 7-pin connector is connected to ground, and pin 7 is connected to a 12V ignition line. A pigtail connection 170 is shown, which connects each pin of the 7-pin connector 205 to a corresponding pin on a corresponding 7-pin connector 155 (see FIG. 4) on the first trailer of the vehicle.

The microcontroller 202 further comprises a mode controller output 214 coupled to each of the plurality of switches 204, 206, 208, 210, 212 and via which the microcontroller controls the state plurality of switches to enable either the lights to which the switch is coupled or CAN communication. Additionally, a mode status pin 216 is configured to indicate a status of each switch to the microcontroller 202.

An output 7-pin connector 218 and pigtail 220 are shown, which couples each pin to its corresponding pin (i.e., pin1-pin1, pin2-pin2, etc.) on an input 7-pin connector on an additional trailer when a multi-trailer configuration is employed. The additional trailer employs a tri-state circuit as described in regard to FIG. 4 and can be coupled to the pigtail 220. Trailers and dollies equipped with the tri-state circuits of FIGS. 4 and 5, respectively, can be coupled together as described herein to build combination-vehicles (double trailer vehicles, triple trailer vehicles, etc.) up to any desired number of trailers.

It will be understood that the herein-described tractor-side circuitry and 7-pin connector may be referred to as "upstream" relative to other components since the tractor portion of the vehicle is at the front of the combined vehicle. Trailer and dolly portions of the combined vehicle may be referred to as "upstream" or "downstream" depending on their position relative to other components of the combined vehicle. The tractor-side circuitry of FIG. 3, for instance, is coupled to a single 7-pin connector since the tractor only couples to a single other component: the trailer immediately downstream from the tractor. The trailer and dolly circuitry are respectively coupled to two 7-pin connectors: an input connector that communicates with a vehicle component immediately upstream, and an output connector that communicates with a vehicle component immediately downstream. "Input" and "Output" as used herein when referring to the 7_pin connectors denote a downstream direction of travel of signal (i.e., away from the tractor). However, it will be appreciated that the described 7-pin connectors are capable of bi-directional communication, whether upstream or downstream.

It will be understood that the pin configurations and the permutations of devices connected to the various pins of FIGS. 3-5 are provided by way of example, and that the subject innovation is not limited to the herein-described configurations and lighting devices. Rather, any suitable device can be controlled in conjunction with the described embodiments, on any pin, so long as the pi configuration is consistent across the tri-state circuits (i.e., tractor-side, trailer-side, dolly, etc.).

Figure 6:
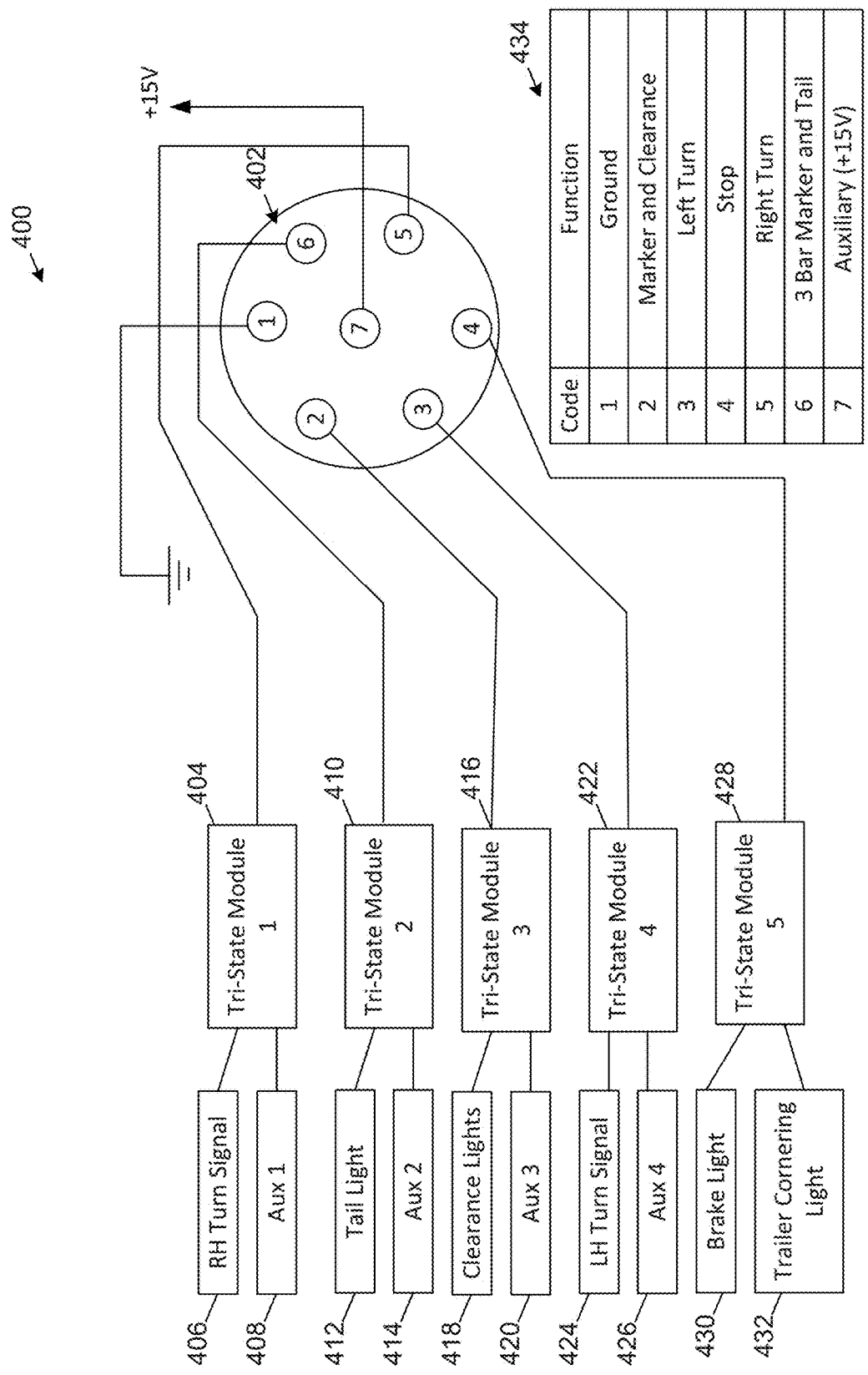
FIG. 6 illustrates a tri-state tractor-side pigtail connector block diagram showing a plurality of tri-state modules, each connected to a single pin and providing dual functionality, in accordance with various features described herein.

FIG. 6 illustrates a tri-state tractor-side pigtail connector block diagram 400 showing a plurality of tri-state modules, each connected to a single pin and providing dual functionality, in accordance with various features described herein. A 7-pin connector 402 has a first pin connected to ground and a seventh pin connected to a voltage source (e.g., 15V). A first tri-state module 404 is coupled to pin 5 on the 7-pin connector and switches between a first device 406 (a right-hand turn signal in the illustrated example) and a first auxiliary function 408 (e.g., a first CAN data line, a backup lamp, or the like) labeled AUX1. A second tri-state module 410 is coupled to pin 6 on the 7-pin connector and switches between a second device 412 (tail lights in the illustrated example) and a second auxiliary function 414 (e.g., a second CAN data line such as a J1939 CAN line or the like) labeled AUX2. A third tri-state module 416 is coupled to pin 2 on the 7-pin connector and switches between a third device 418 (clearance lights in the illustrated example) and a third auxiliary function 420 (e.g., a third CAN data line, such as a J1587 CAN line or the like) labeled AUX3. A fourth tri-state module 422 is coupled to pin 3 on the 7-pin connector and switches between a fourth device 424 (left-hand turn signal in the illustrated example) and a fourth auxiliary function 426 (e.g., a fourth CAN data line, a dedicated CAN line such as for transmitting tire pressure data, or the like) labeled AUX4. A fifth tri-state module 428 is coupled to pin 4 on the 7-pin connector and switches between a fifth device 430 (brake lights in the illustrated example) and a sixth device 432 (e.g., trailer cornering lights). The lighting functions of the 7 pins of the 7-pin connector 402 are denoted in a key 434 in FIG. 6.

Figure 7:
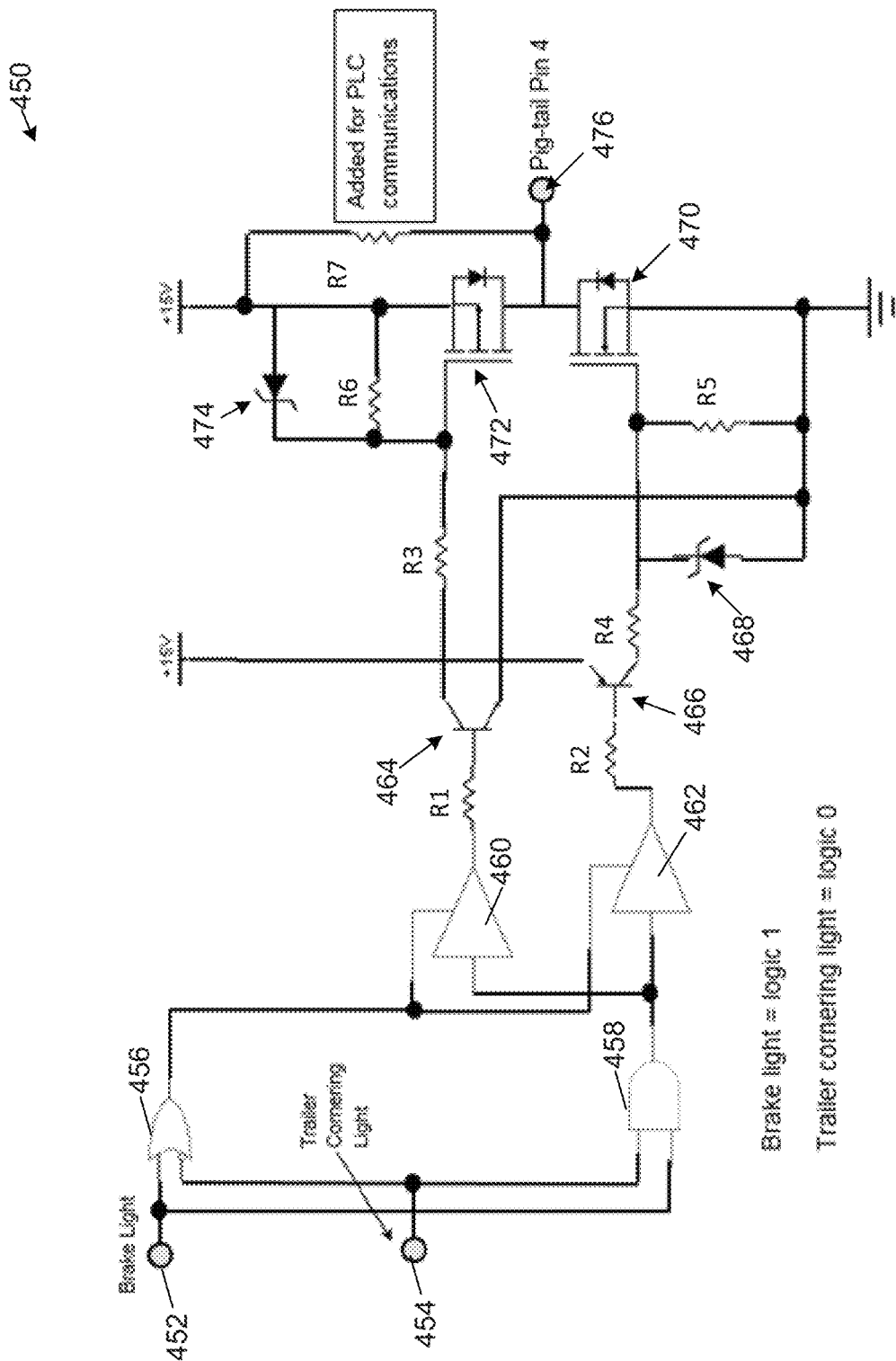
FIG. 7 shows a tractor-side tri-state pigtail connector circuit, in accordance with one or more features described herein.

FIG. 7 shows a tractor-side tri-state pigtail connector circuit 450, in accordance with one or more features described herein. The circuit shown corresponds to the fifth tri-state module 428 of FIG. 6, which controls switching between brake lights and trailer cornering lights. The circuit comprises a brake light input 452 and a trailer cornering light input 454, which provide signals for operating respectively the brake lights and trailer cornering lights, and which are fed into an OR logic component 456 as well as into an AND logic component 458. It will be understood that the functions of the logic components shown in FIG. 7 can also be performed using firmware, in accordance with one embodiment. Output from each of the OR logic component and the AND logic component is fed into each of a first logic buffer 460 and a second logic buffer 462. In one embodiment the logic buffers 460 and 462 are 74HC126 logic buffers.

Output from the first logic buffer 460 is passed through a first resistor R21 (e.g., 22 kiloohms or the like), which in turn is coupled to a base of an NPN transistor 464. Output from the second logic buffer 462 is passed through a second resistor R2 (e.g., 22 kiloohms or the like), which in turn is coupled to a base of a PNP transistor 466.

The collector of the NPN transistor 464 is coupled to a third resistor R3 (e.g., 100 kiloohms or the like), and the emitter of the NPN transistor 464 is coupled between an anode of a Zener diode 468 (e.g., a 15V Zener diode or a Zener diode having a voltage rating compatible with the applied voltage source) and a fifth resistor R5 (e.g., 330 kiloohms or the like). The emitter of the PNP transistor 466 is coupled to a voltage supply (e.g., 15V), and the emitter of the PNP transistor is coupled to a fourth resistor R4 (e.g., 100 kiloohms or the like) which in turn is coupled to a cathode of the Zener diode 468 and a resistor R5 (e.g., 330 kiloohms or the like) that is also coupled to ground and to a gate of a MOSFET 470. The source of the MOSFET 470 is coupled to ground.

The third resistor R3 is coupled to a sixth resistor R6 (e.g., 330 kiloohms or the like) and to a gate of a second MOSFET 472. The sixth resistor R6 is also coupled to a cathode of a Zener diode 474 and to a voltage source (e.g., 15V), which is also coupled to an anode of the Zener diode 474 (e.g., a 15V Zener diode or a Zener diode having a voltage rating compatible with the applied voltage source). A pigtail pin (Pin 4 in the illustrated example) is coupled a seventh resistor R7 (e.g., 47 kiloohms) which in turn is coupled to the voltage source (e.g., 15V). The pigtail pin is also coupled to the drains of both MOSFETS 470, 472.

It will be understood that when the circuit logic represents a 1 or "ON" condition, the brake lights are illuminated. When the circuit logic represents a 0 or "OFF" condition, the trailer cornering lights are illuminated.

Figure 8:
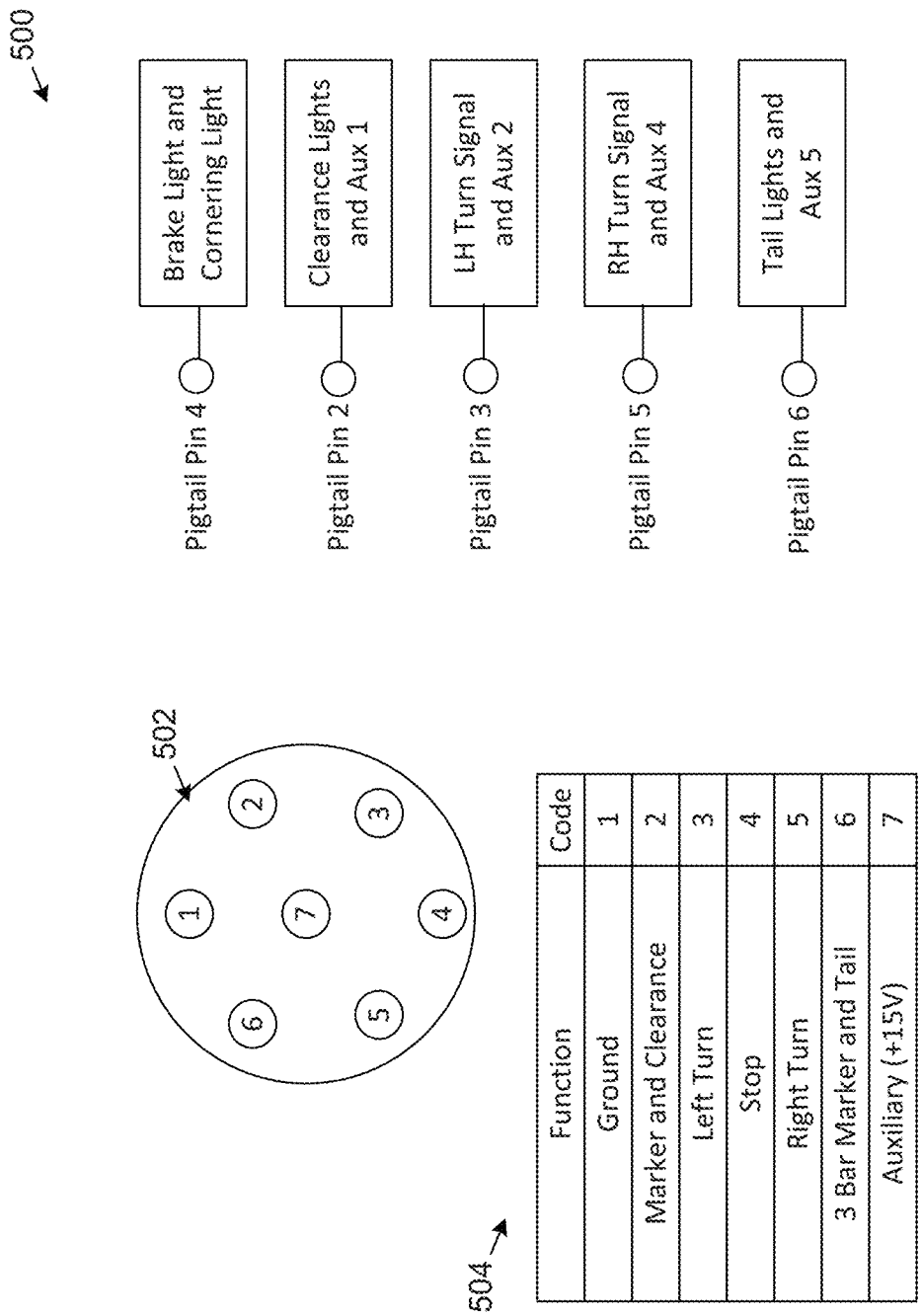
FIG. 8 illustrates a trailer-side tri-state pigtail block diagram, in accordance with various features described herein, wherein each of pigtail pins 2-6 on a 7-pin connector is switchable between two functions.

FIG. 8 illustrates a trailer-side tri-state pigtail block diagram, in accordance with various features described herein, wherein each of pigtail pins 2-6 on a 7-pin connector is switchable between two functions. The lighting functions of the 7 pins of the 7-pin connector 502 are denoted in a key 504 in FIG. 8. Pin 1 is coupled to ground while pin 7 is coupled to a voltage source (e.g., 15V or the like).

Pin 2 switches between providing power to clearance lights on the trailer and providing a first auxiliary function (e.g., a first CAN data connection or the like). Pin 3 switches between providing power to left hand turn signal lights on the trailer and providing a second auxiliary function (e.g., a second CAN data connection or the like). Pin 4 switches between providing power to brake lights on the trailer and power to trailer cornering lights. Pin 5 switches between providing power to right hand turn signal lights on the trailer and providing a third auxiliary function (e.g., a third CAN data connection or the like). Pin 6 switches between providing power to tail lights on the trailer and providing a fourth auxiliary function (e.g., a fourth CAN data connection or the like).

Figure 9:
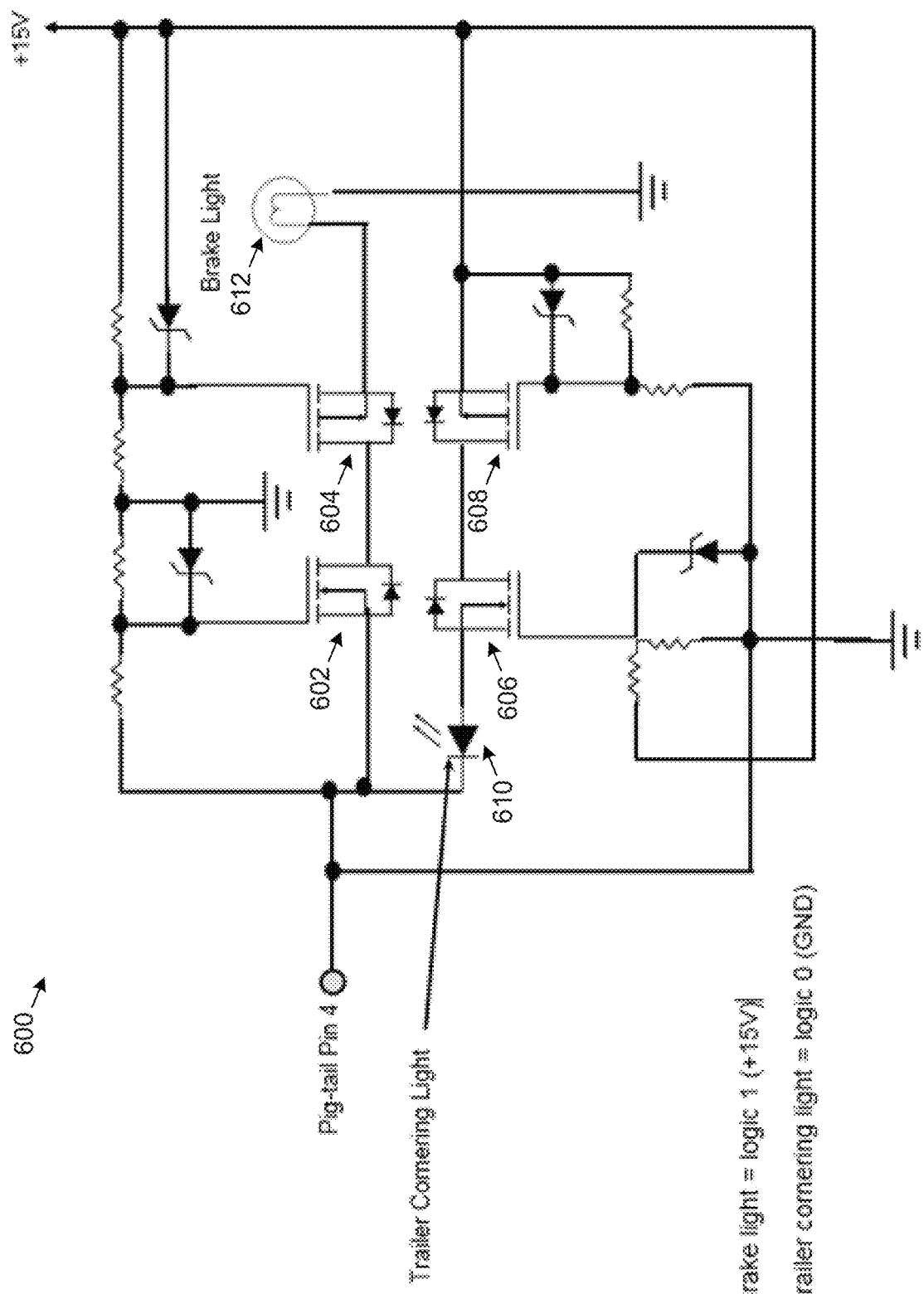
FIG. 9 illustrates a trailer-side tri-state pigtail circuit such as is employed to facilitate switching between two functions on a single pin of a 7-pin connector, in accordance with one or more features described herein.

FIG. 9 illustrates a trailer-side tri-state pigtail circuit 600 such as is employed to facilitate switching between two functions on a single pin of a 7-pin connector, in accordance with one or more features described herein. The circuit 600 represents an example of a circuit that may be used in conjunction with various features, wherein MOSFETs 602, 604, 606, 608 are employed for communication drivers and high-current switching of lights and other devices (e.g., CAN data lines or the like). In the illustrated example, the circuit is connected to pin 4 of a 7-pin connector and switches between providing power to trailer cornering lights 610 and brake lights 612.

It will be understood that when the circuit logic represents a 1 or "ON" condition (+15V), the brake lights are illuminated. When the circuit logic represents a 0 or "OFF" condition (GND), the trailer cornering lights are illuminated. It will further be understood that the brake light and trailer cornering light depicted in FIG. 9 are provided by way of example and not limitation, and that any two devices and/or data communication lines can be controlled by the illustrated circuit.

The foregoing embodiments provide several advantages over conventional systems and approaches. For instance, a 7-pin pigtail employing the above-described innovations can drive 10 devices rather than the conventional 5, doubling the capacity of the conventional pigtail connector. Safety logic provided by the described circuits makes it possible to simultaneously switch on both ground and power. Solid-state switching enables use of higher current for CAN communications that is much more reliable and robust than conventional PLC approaches to communications on data lines using the described systems have much higher noise immunity due to switching from ground to +12V/+15V instead of having the data modulated on the +12V/+15V line. Solid-state switching on the trailer-end prevents both supported loads from activated at half-power. Additionally, all drivers are protected with Zener diodes to prevent electrostatic discharge (ESD) damage and damage from voltage spikes in the line protected lines.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A tri-state switching device that facilitates selectively providing power and data transmission via a connection in a vehicle, comprising:
   a microprocessor configured to communicate over a plurality of data communication lines and coupled to a plurality of tri-state switches;
   circuitry comprising the plurality of tri-state switches each configured to switch between a first position, a second position, and an open position;
   wherein the microprocessor is further configured to control selectively the positions of said each of the plurality of tri-state switches;
   wherein in the first position of said each of the plurality of tri-state switches provides power to a first on-board device of a plurality of on-board devices, and wherein in the second position of said each of the plurality of tri-state switches provides power to a second on-board device of the plurality of on-board devices or provides a data communication connection over which data can be transmitted and received;
   wherein the plurality of tri-state switches are configured to control switching between providing power to the first or second on-board devices and providing the data communication connection.

2. The tri-state switching device according to claim 1, comprising five tri-state switches, each of the five tri-state switches being coupled to one of five respective dedicated pins on a connector.

3. The tri-state switching device according to claim 2, wherein the connector is an output connector configured for transmitting signal to a downstream connector.

4. The tri-state switching device according to claim 3, wherein each of the five tri-state switches is further coupled to said one of the five respective dedicated pins on the downstream connector configured for receiving signal from the connector.

5. The tri-state switching device according to claim 1, wherein the data communication connection is a controller area network (CAN) data connection.

6. The tri-state switching device according to claim 5, wherein each of said CAN data connection has a high voltage variant (CAN HI) and a low voltage variant (CAN LO), and wherein the CAN HI and CAN LO data connections individually coupled to respective dedicated switches of the plurality of tri-state switches.

7. The tri-state switching device according to claim 1, wherein for the plurality of tri-state switches configured to control switching between providing said power to an on-board device and providing the data communication connection, the on-board device comprises one or more exterior vehicle lights, such that interruption of said power to the one or more exterior vehicle lights is imperceptible to a human.

8. The tri-state switching device according to claim 7, wherein the microprocessor is further configured to limit data transmission over the data communication connection to approximately 25 ms or less.

9. The tri-state switching device according to claim 1, wherein for the at least one plurality of tri-state switches configured to control switching between providing said power to an on-board device and providing the data communication connection, the on-board device comprises one or more turn signal lamps, and the microprocessor is further configured to limit data transmission over the data communication connection to an OFF portion of a turn signal lamp duty cycle that interruption of said power to the one or more turn signal lamps is imperceptible to a human.

10. The tri-state switching device according to claim 1, wherein one of the plurality of tri-state switches is coupled to two on-board devices of the plurality of on-board devices and four of the plurality of tri-state switches are each respectively coupled to one data communication connection and one on-board device of the plurality of on-board devices, such that the microprocessor controls six on-board devices of the plurality of on-board devices and four data communication connections.

11. The tri-state switching device according to claim 1, wherein the plurality of on-board devices comprise external vehicle light systems comprising one or more of:
 a right-hand turn signal system;
 a left-hand turn signal system;
 a tail light system;
 a brake light system;
 a clearance light system; and
 a trailer cornering light system.

12. The tri-state switching device according to claim 1, wherein the connector is a 7-pin connector.

13. The tri-state switching device according to claim 1, wherein the microprocessor is further configured to detect a mode status of said each of the plurality of tri-state switches describing a position of said each of the plurality of tri-state switches to which the microprocessor is connected, said position being one of the first position and the second position.

14. A tractor-side tri-state switching device that facilitates selectively providing power and data transmission via a connection from a tractor in a combination vehicle, comprising:
 a printed circuit board (PCB) comprising a microprocessor configured to control selectively a position of each of five tri-state switches, said each of the five tri-state switches being coupled to one of five respective dedicated pins on a connector, wherein said each of the five tri-state switches configured to switch between a first position, a second position, and an open position;
 wherein in the first position of said each of the five tri-state switches provides said power to a first vehicle lamp system, and wherein in the second position of said each of the five tri-state switches provides said power to a second vehicle lamp system or provides a data communication connection over which data can be transmitted and received;
 wherein the five tri-state switches are configured to control switching between providing said power to the first or second vehicle lamp system and providing the data communication connection.

15. The tractor-side tri-state switching device according to claim 14, wherein the data communication connection is a controller area network (CAN) data connection.

16. The tractor-side tri-state switching device according to claim 14, wherein for the five tri-state switches configured to control switching between providing said power to the first or second vehicle lamp system and providing the data communication connection, the first or second vehicle lamp system comprises one or more exterior vehicle lamps, such that interruption of said power to the one or more exterior vehicle lamps is imperceptible to a human.

17. The tractor-side tri-state switching device according to claim 16, wherein the microprocessor is further configured to limit said data transmission over the data communication connection to approximately 25 ms or less.

18. The tractor-side tri-state switching device according to claim 14, wherein for the five tri-state switches configured to control switching between providing said power to the first or second vehicle lamp system and providing the data communication connection, the first or second vehicle lamp system comprises one or more turn signal lamps, and the microprocessor is further configured to limit said data transmission over the data communication connection to an OFF portion of a turn signal lamp duty cycle that interruption of said power to the one or more turn signal lamps is imperceptible to a human.

19. The tractor-side tri-state switching device according to claim 14, wherein the connector is a 7-pin connector.

20. A down-stream tri-state switching device that facilitates selectively providing power and data transmission via a connection received from a tractor upstream in a combination vehicle, comprising:
 a printed circuit board (PCB) comprising a microprocessor configured to control selectively a position of each of five tri-state switches, said each of the five tri-state switches being coupled to one of five respective dedicated pins on an input connector and to corresponding pins on an output connector, wherein said each of the five tri-state switches is configured to switch between a first position, a second position, and an open position;
 wherein in the first position of said each of the five tri-state switches provides said power to a first vehicle lamp system, and wherein in the second position of said each of the five tri-state switches provides said power to a second vehicle lamp system or provides a data communication connection over which said data can be transmitted and received;

wherein the five tri-state switches are configured to control switching between providing said power to the first or second vehicle lamp system and providing the data communication connection.

21. The down-stream tri-state switching device according to claim 20, wherein the data communication connection is a controller area network (CAN) data connection.

22. The down-stream tri-state switching device according to claim 20, wherein the five tri-state switches configured to control switching between providing said power to the first or second vehicle lamp system and providing the data communication connection, the first or second vehicle lamp system comprises one or more exterior vehicle lamps, such that interruption of said power to the one or more exterior vehicle lamps is imperceptible to a human.

23. The downstream tri-state switching device according to claim 22, wherein the microprocessor is further configured to limit said data transmission over the data communication connection to approximately 25 ms or less.

24. The down-stream tri-state switching device according to claim 20, wherein the five tri-state switches configured to control switching between providing said power to the first or second vehicle lamp system and providing the data communication connection, the first or second vehicle lamp system comprises one or more turn signal lamps, and the microprocessor is further configured to limit said data transmission over the data communication connection to an OFF portion of a turn signal lamp duty cycle that interruption of said power to the one or more turn signal lamps is imperceptible to a human.

25. The downstream tri-state switching device according to claim 20, wherein the connector is a 7-pin connector.

* * * * *